G. H. GERE.
MECHANICAL MOVEMENT.
APPLICATION FILED OCT. 2, 1913.
1,127,752.
Patented Feb. 9, 1915.
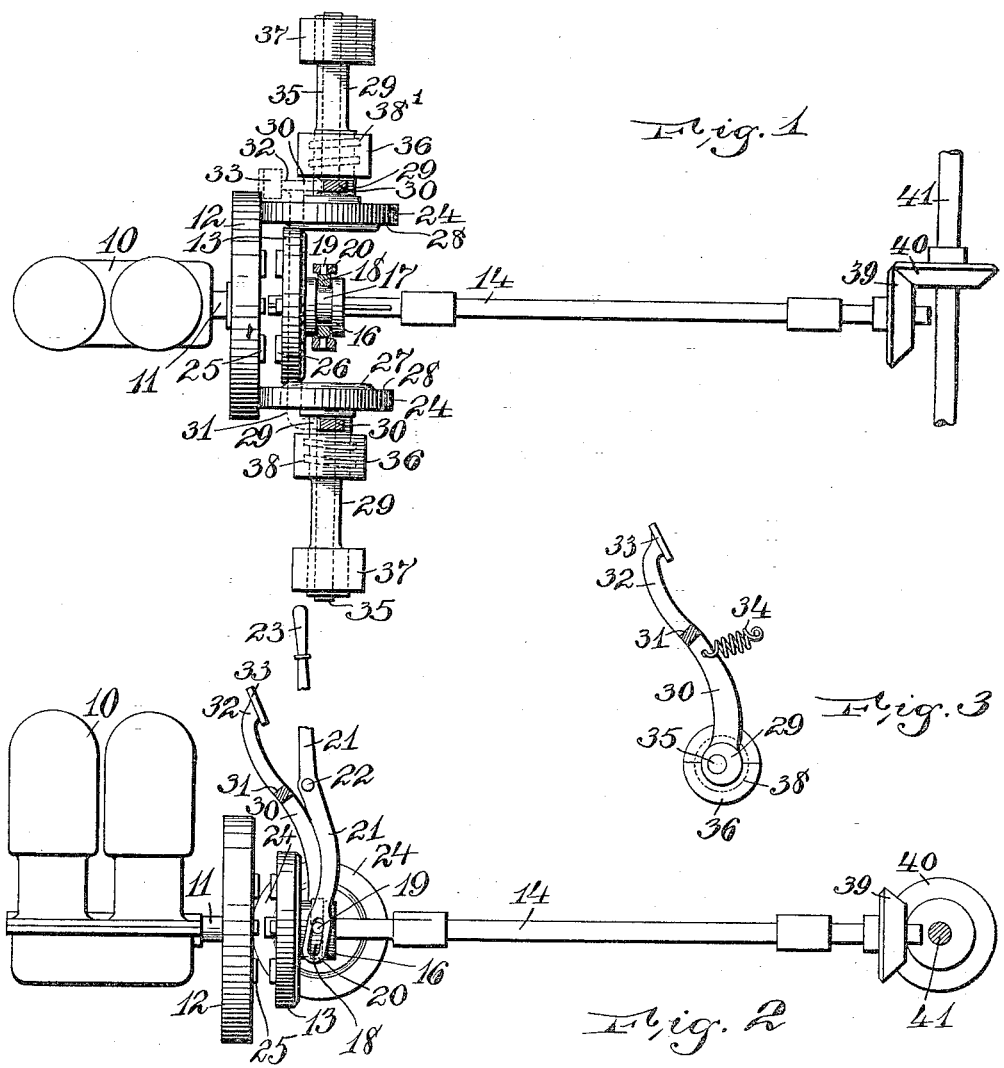
WITNESSES:
M. A. Johnson
Charles J. Liedtke
INVENTOR
George H. Gere.
BY
Dyke & Caufield,
ATTORNEYS.

UNITED STATES PATENT OFFICE.

GEORGE H. GERE, OF NEWARK, NEW JERSEY.

MECHANICAL MOVEMENT.

1,127,752.     Specification of Letters Patent.     Patented Feb. 9, 1915.

Application filed October 2, 1913. Serial No. 792,969.

*To all whom it may concern:*

Be it known that I, GEORGE H. GERE, a citizen of the United States, and a resident of Newark, county of Essex, and State of New Jersey, have invented certain new and useful Improvements in Mechanical Movements, of which the following is a specification.

This invention relates to a mechanical movement especially adapted to provide for regulating the speed of a driven pulley by the utilization of a power transmitting mechanism which in turn is driven by a driving pulley, and further to a construction that permits the direct connection of the driving pulley with the driven pulley and automatically relieves the power transmitting mechanism when the direct connection is made.

The invention relates particularly to a friction driving mechanism in which a driving pulley has its face in engagement with the peripheries of friction pulleys, the friction pulleys having a driven pulley between them and movable along their faces to vary its speed. The driving pulley and the driven pulley are arranged so that they can be directly connected, and the friction pulleys rendered inoperative when said direct connection takes place.

The invention also comprises means for moving the friction pulleys or other power transmitting mechanism so that they can be moved toward or from the driving pulley to prevent transmission therefrom and also toward and from the driven pulley.

One embodiment of the invention is illustrated in the accompanying drawing showing the movement arranged to provide both an indirect and direct drive from an engine to a driven shaft, in which arrangement my improved mechanical movement may be used, for example, as an automobile transmission mechanism, such application of the movement being chosen for purposes of illustration and to provide for a clearer presentation of the invention.

In the drawing similar reference numerals indicate corresponding parts in the several figures.

Figure 1 is a top view of the mechanical movement as applied to an automobile transmission. Fig. 2 is a side view of the mechanism shown in Fig. 1 with one of the friction pulleys omitted. Fig. 3 is a detail of a lever and bearing for the shaft of one of the friction pulleys.

In the form shown the movement is illustrated in connection with an engine 10. To the shaft 11 of the engine is secured a driving pulley 12. A driven pulley 13 is arranged parallel with the driving pulley 12 and is movable toward and from the driving pulley. One way of providing for this movement is shown and consists of a mainshaft 14 on which is a feather 15 on which the pulley 13 slides. A collar 16 has a groove 17 in which the ring 18 is placed, the ring having studs 19 over which the slotted forks 20 are placed, the forks being on a lever 21 pivoted at 22 and having a handle 23 for its manipulation. Friction pulleys 24 are so disposed that their peripheries can be placed against the face of the driving pulley 12 and their faces placed against the periphery of the driven pulley 13. This forms a friction driving mechanism in which the driving and driven pulleys are rotated at relatively variable speeds, the speed of the driven pulley varying according to its position along the faces of the friction pulleys. When moved backward beyond the center of the friction pulleys, the direction of rotation of the driven pulley is reversed.

The shaft 14 extends toward the driving pulley any desired distance, and in any event is long enough to permit the driven pulley to be directly connected to the driving pulley. Any connection for this direct drive can be employed, and I show a simple form consisting of studs 25 on the driving pulley and co-acting studs 26 on the driven pulley, the studs 25 and 26 being adapted to interlock with each other, thus forming a positive clutch between the pulleys 12 and 13 when brought into contact with one another, and causing the rotation of the pulleys 12 and 13 in unison. The friction pulleys or other transmitting mechanism must of course be made inactive when the direct drive connection is made. In the form shown, the faces 27 of the pulleys 24 are cut away at 28 so that when the driven pulley is moved up to the driving pulley to directly connect them, the driven pulley clears the edges of the friction faces 27 and does not touch the friction pulleys as it rests opposite the cut-away portions 28. This cutting away of the face adjacent to the periphery is a simple way of causing the disengagement of the friction pulleys and the driven pulley, but it will be evident that other means of bringing this disengagement about can be used.

I prefer to mount the friction pulleys so that they can be moved, and means are provided for moving the pulleys toward each other, that is, to press them against the driven pulley, and means are also provided for moving them so as to bring their peripheries tightly against the driving pulley. Independent means may be employed for this purpose, but I show, in the drawing, a construction that provides for the movement of the pulleys in both directions by one lever. The embodiment that is shown in the drawing embraces sleeves 29 which are shown provided with arms 30 which are connected by a cross-arm 31 so that the arms 30 can be moved together, and a foot-lever 32 for imparting rotation to the sleeves 29 and here shown as forming an extension of one of the arms 30. The lever 32 is provided with a foot-piece 33, which is employed to move the lever 32 in one direction, while a spring 34 is utilized to pull it back when released. It will be evident, however, that other means for moving the sleeves can be used.

The friction pulleys 24 are mounted on the shafts 35 which are eccentrically mounted in the sleeves 29, the said sleeves being extended through the bearings 36 and 37 so as to provide sufficient stiffness to prevent the friction pulleys from being forced out of their planes of rotation. It will be evident that when the lever 32 is pushed forward the eccentric mounting of the shafts 35 will force the friction pulleys forward with their peripheries tight against the driving pulley. To provide for the movement of the friction pulleys toward and from each other, the sleeves 29, 29 are provided, respectively, with right and left hand inclined ribs 38, 38', which are placed in corresponding grooves in the bearings 36, 36, and when the sleeves 29 are turned by the lever 32 they are forced lengthwise by the inclined ribs 38, 38', so that each of the said sleeves 29 presses its friction pulley toward and into contact with the driven wheel 13.

The shaft 14 transmits its power in any desired way, the illustration showing it as applied to an automobile or the like, with gears 39 and 40 in mesh so as to transmit the power from the shaft 14 to a shaft 41 which can be a jack-shaft, an axle or similar structure.

The operation of my improved mechanical movement may best be understood from a description of the device illustrated, and in which it is utilized for transmitting power from the engine 10 to the shaft 14. When the lever 32 is retracted by the spring 34 the friction pulleys are not in contact with either the driving pulley or the driven pulley. When the lever 32 is pushed forward, however, the friction pulleys are forced in contact with the driven pulley and the driving pulley as above described.

Upon swinging the lever 21, by means of the handle 23, the driven pulley can be arranged in any desired relation to the friction pulleys; as for example, it may be disposed opposite the centers of the friction pulleys and thus be in neutral position. If the lever 21 is swung to move the driven pulley in front of the centers of the friction pulleys, the driven pulley will be driven in the same direction as the driving pulley, and if swung to move the driven pulley in the rear thereof, the direction of rotation of the shaft 14 will be reversed and will thus furnish a reversed gear.

When the driven pulley is moved along the face of the friction pulleys toward the driving pulley, the speed of the driven pulley will be increased as it travels toward the peripheries of the friction pulleys. It will thus be evident that this mechanism provides an easy starting device and the speed can be increased at any desired rate.

If it is desired to drive the shaft 14 directly from the driving pulley, the driven pulley 13 is moved forward until a suitable clutch or connecting means between the driving and driven pulleys is operative. In the form shown the driven pulley is moved forward until the studs 25 and 26 are in engagement and the driving shaft and the driven shaft rotate together at the same speed. When this engagement takes place the driven pulley has moved beyond the friction faces 27 and is opposite the cut-away portions 28 of the pulleys 24, and is therefore no longer in contact with the friction pulleys 24. Such direct connection having been made so as to rotate the shaft 14 at high speed directly from the engine shaft, the friction pulleys can be disengaged from the driving pulley by permitting the lever 32 and arms 30 to be moved back by means of the spring 34, preventing unnecessary wear on the friction pulleys and the parts connected therewith.

The parts may readily be so proportioned that the driven pulley is rotated at nearly the speed of the driving pulley when it passes from its indirect connection through the power-transmitting means to its direct connection with the driving pulley.

This mechanical movement can be utilized in a great many different relations, but it will be obvious that it is well adapted for automobile purposes, and it has been illustrated in the drawing so that its adaptability to automobile operation is indicated. The starting is accomplished at low speed and the movement into high speed and the direct drive is gradual and can be easily regulated.

It will be noted that details of construction can be changed and dispositions of the parts can be altered without departing from the scope of the invention, since the invention is broadly designed to provide an indirect transmission between a driving pulley and a driven pulley, and to also provide for the automatic disengagement of the transmission means for indirect driving, when the direct drive is made operative.

Having thus described my invention, what I claim is:—

1. A mechanical movement comprising a driving pulley, a driven pulley, means for moving the pulleys together and apart, the pulleys being parallel, means on the pulleys for coupling them when they are together, a friction pulley operating with its periphery on the face of the driving pulley, the friction pulley having its face presented to the periphery of the driven pulley, the friction pulley adjacent to its edge being constructed to prevent the transmission of power from the friction pulley to the driven pulley.

2. A mechanical movement comprising a driving pulley, a driven pulley parallel to the driving pulley, means for moving the driven pulley toward and from the driving pulley, means for directly connecting the pulleys when the pulleys are moved together, and a friction pulley at right angles to the driving pulley and in contact with the driven pulley, the friction pulley being formed near the edge of its face so as to prevent transmission of its power to the driven pulley when the driven pulley is driven directly from the driving pulley.

3. A mechanical movement comprising a driving pulley, a driven pulley parallel to the driving pulley, means for moving the driven pulley toward and from the driving pulley, means for directly connecting the pulleys when the pulleys are moved together, and a friction pulley at right angles to the driving pulley and in contact with the driven pulley, the friction pulley being cut-away near the edge of its face to provide a clearance at that point between it and the driven pulley.

4. A mechanical movement comprising a driving pulley, a driven pulley movable toward and from the driving pulley, a friction pulley with its face recessed at its edge, the face of the friction pulley being opposed to the periphery of the driven pulley, the friction pulley having its periphery opposed to the face of the driving pulley, means for moving the friction pulley toward and from the driving pulley and the driven pulley, means for moving the driven pulley along the face of the friction pulley, and means for directly connecting the driven pulley to the driving pulley when the driven pulley is moved to the recessed edge of the friction pulley.

5. A mechanical movement consisting of a pair of friction pulleys parallel to each other, a driven pulley between the friction pulleys and movable along the faces of said friction pulleys, a driving pulley with its face against the peripheries of the friction pulleys, said driving pulley being fixed against movement from said friction pulleys when engaged by the driven pulley, the friction pulleys being formed so that they are disconnected from the driven pulley when said driven pulley approaches the edge of the friction pulleys, and means for directly connecting the driving pulley with the driven pulley when the driven pulley is disconnected from the friction pulleys.

In testimony that I claim the foregoing, I hereto set my hand, this 1st day of October, 1913.

GEORGE H. GERE.

Witnesses:
 Wm. H. Camfield,
 M. A. Johnson.